United States Patent [19]

Bronner

[11] Patent Number: 4,518,840
[45] Date of Patent: May 21, 1985

[54] METHOD AND APPARATUS FOR MINIMIZING THE POWER INDUCED IN A FLAT CONDUCTING PRODUCT MAINTAINED IN POSITION ELECTROMAGNETICALLY WITHOUT CONTACT

[75] Inventor: Jean-Claude Bronner, Rueil-Malmaison, France

[73] Assignee: CEM Compagnie Electro-Mecanique, Paris, France

[21] Appl. No.: 464,952

[22] Filed: Feb. 8, 1983

[30] Foreign Application Priority Data

Feb. 18, 1982 [FR] France .................................. 80 02679

[51] Int. Cl.³ ........................... H05B 5/00; H05B 6/64
[52] U.S. Cl. ............................. 219/10.67; 219/10.71; 219/10.75; 219/10.41; 219/10.57
[58] Field of Search ................... 219/7.5, 10.77, 10.67, 219/10.57, 10.41, 10.71, 10.75

[56] References Cited

U.S. PATENT DOCUMENTS 3,041,434 6/1962 Alf ...................................... 219/10.41
4,122,321 10/1978 Cachat ............................ 219/10.41
4,321,444 3/1982 Davies ............................ 219/10.41

*Primary Examiner*—Roy N. Envall, Jr.
*Assistant Examiner*—Marvin M. Lateef

*Attorney, Agent, or Firm*—Burns, Doane, Swecker & Mathis

[57] ABSTRACT

A method and apparatus for minimizing the power induced in a moving or stationary, flat, conducting product which is maintained in position without contact by electromagnetic forces. Inductors on each side of the product subject certain zones of the product to two alternating, essentially equivalent, opposing magnetic fluxes acting perpendicularly to surfaces of the product on opposite sides thereof so that, in each of the zones, with the product in a position of equilibrium, the component of magnetic flux of the resultant field perpendicular to each zone is minimal and the component parallel to each zone is at a maximum, due to the mutual deflection of the two fluxes. Each inductor has a plurality of poles and the opposing fluxes are produced by generating magnetic fields of like polarity in opposing poles of the inductors while generating, in adjacent poles of the inductors themselves, magnetic fields of opposite polarities. The inductors are of various overall configurations and are comprised of poles of various shapes depending upon the type of product involved. The magnitudes of the fluxes of each pair of inductors acting on the different zones may be regulated independently to obtain forces of different intensities in each of the corresponding zones of the product.

12 Claims, 4 Drawing Figures

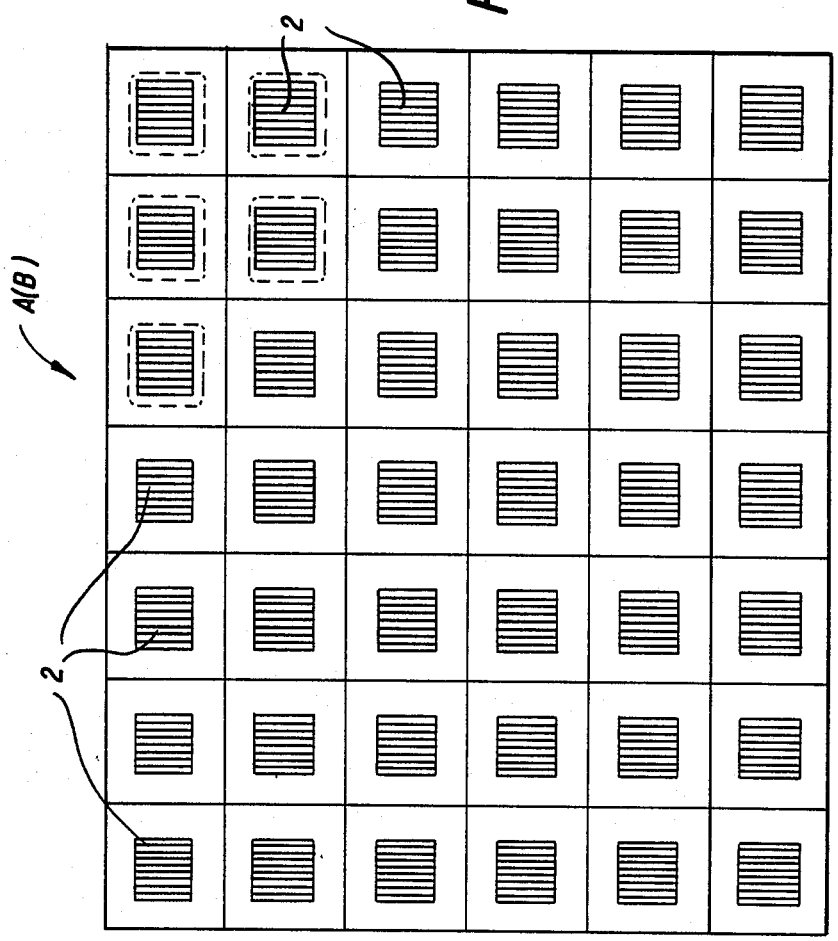

METHOD AND APPARATUS FOR MINIMIZING THE POWER INDUCED IN A FLAT CONDUCTING PRODUCT MAINTAINED IN POSITION ELECTROMAGNETICALLY WITHOUT CONTACT

BACKGROUND OF THE INVENTION

The present invention relates to a method and apparatus for minimizing the power induced in a moving or stationary flat conducting product which is maintained in position without contact by electromagnetic forces.

The present invention is applicable, in particular, to finishing operations such as heat treatment and, in general, when it is necessary to displace or to maintain conducting products without contact and without heating.

Known ways of displacing or maintaining flat, conducting products without contact by means of electromagnetic forces have the disadvantage of inducing an appreciable (non-negligible) degree of heating. They generally comprise a single inductor I placed under the product P to be displaced or maintained without contact (see FIG. 1 of the drawings attached hereto), with the intensity and frequency of the magnetic field being adapted to the physical properties and the dimensions of the product.

The method and apparatus which are the object of the present invention, make it possible to considerably reduce the heating induced in a moving or stationary flat, conducting product which is subjected to electromagnetic forces in order to maintain it in a position, i.e. guide it and levitate it, without contact.

The method comprises subjecting the product in certain zones of the two opposing alternating magnetic fluxes essentially equivalent to each other and perpendicularly disposed relative to the corresponding surface of the product in the zones, so that in each of the zones, with the product in a position of equilibrium, the component of the magnetic flux of the resultant field perpendicular to each zone is minimal and the components parallel to each zone are at a maximum, by virtue of a deflection of the two fluxes.

Apparatus suitable to perform the method comprises, for each zone wherein electromagnetic forces are induced, at least one pair of inductors, each with several poles, the polar surfaces of which are essentially parallel to a surface of the product in each zone, the two inductors of the pair being placed in a manner essentially symmetrical with respect to a location in the zone corresponding to the desired equilibrium position of the product, with the poles of the inductors facing each other in pairs on either side of the product being maintained instantaneously at the same polarity and with the fluxes passing through them being of essentially the same magnitude.

In a particular embodiment especially but not exclusively suitable for the treatment of strip, each of the inductors comprises successive poles of an elongated form, which are alternatingly North and South at a given instant.

In a further embodiment, particularly but not exclusively well suited for the treatment of sheet or plate, each of the inductors comprises identical poles placed regularly in keeping with an identical polar pitch in two orthogonal directions. In each of the two directions, at each instant, successive poles are alternatingly North and South.

BRIEF DESCRIPTION OF THE DRAWINGS

Further characteristics and advantages of the present invention will become apparent from the description to follow hereinafter with regard to the drawings attached hereto, in which:

FIG. 4 is a plan view of an embodiment of one of the two inductors of a device according to the invention, adapted for the treatment of sheet or plate.

DETAILED DESCRIPTION

Figure 1:
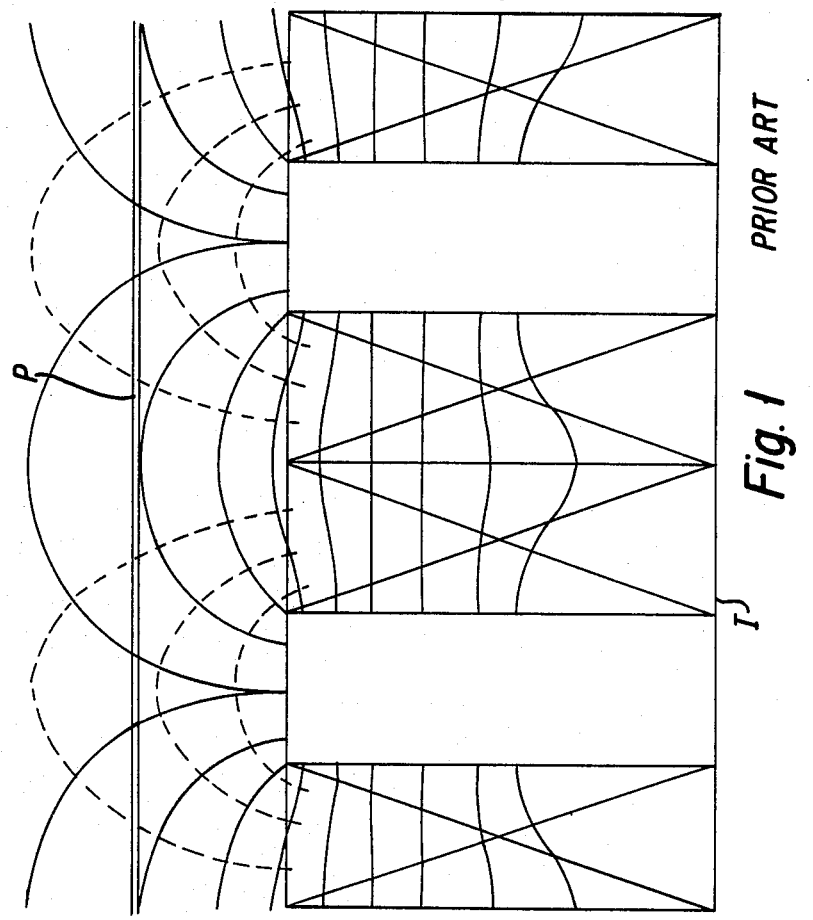
FIG. 1 is a view in elevation of a known device for the electromagnetic levitation of flat, conducting products comprising a single inductor placed under the product to be levitated.
Figure 2:
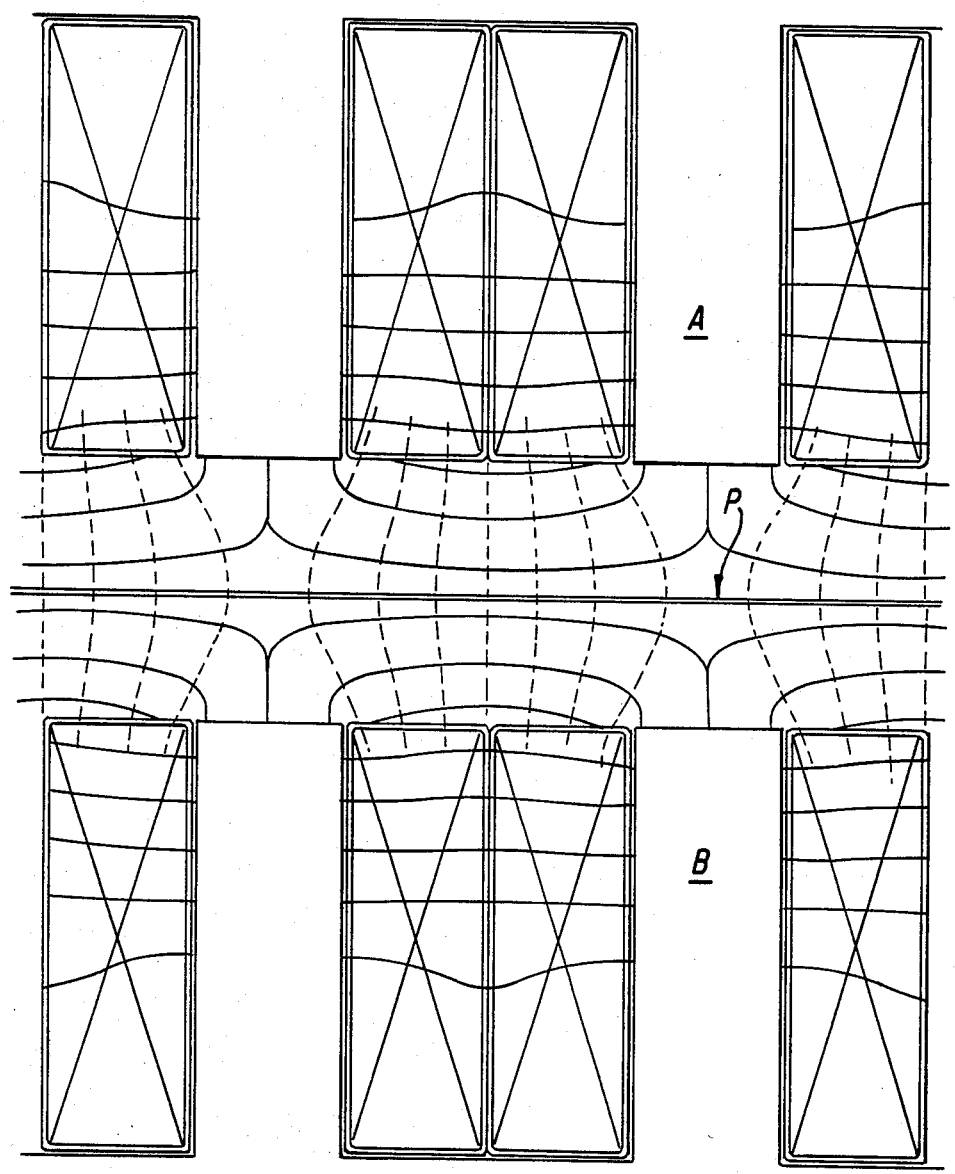
FIG. 2 is a view in elevation of a device, according to the invention, for the electromagnetic levitation of flat, conducting products.

In the embodiment illustrated in FIG. 2, a device for the electromagnetic levitation of flat, conducting products comprises a pair of essentially identical horizontal inductors A and B facing each other, placed on either side of the product P and each comprising several poles, successively North and South at a given instant. Identical poles facing each other in pairs are always of the same magnetic polarity.

The two essentially equivalent, alternating magnetic fluxes obtained in the zone of levitation of the product are opposed and thus mutually deflect each other, with the component of the resultant field which is perpendicular to the product being minimal, while the components parallel to the product are at a maximum.

Figure 3:
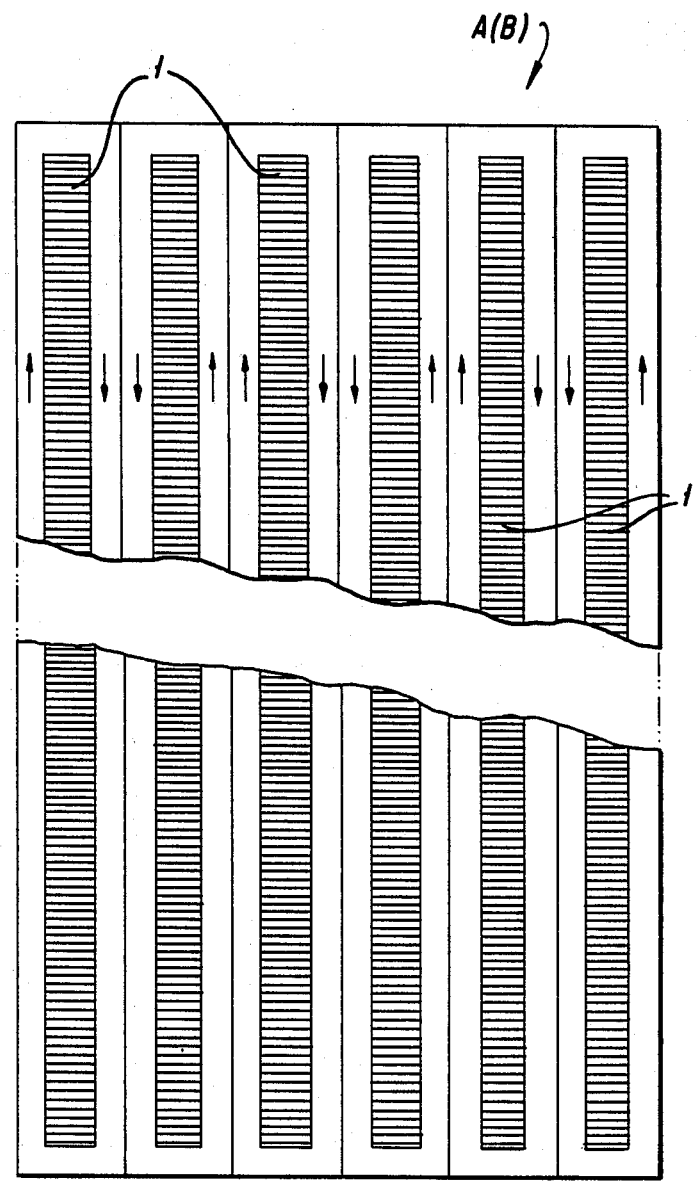
FIG. 3 is a plan view of an embodiment of one of the two inductors of a device according to the invention, adapted for the treatment of strip.

In the embodiment of the invention shown in FIG. 3, particularly but not exclusively suitable for the treatment of flat, conducting, strip products, each of the inductors A and B includes successive poles 1 of an elongated form, which are successively North and South at a given instant.

In an embodiment of the invention of which FIG. 4 is a special case, suitable particularly but not exclusively for the treatment of conductive sheet or plate products, each of the inductors comprises several identical poles 2 having principal cross-sectional dimensions of the same order of magnitude and regularly positioned in two different directions. In each of the positional directions, consecutive poles are successively North and South at a given instant.

It should be understood that the invention is applicable to the case wherein it is desired to create forces of different intensities at different zones of the product. This may be accomplished by means of independent controls for controlling the magnitude of the magnetic flux in each of the zones, for example to maintain in position products exposed differently over their surfaces to forces such as jets of fluids or gravity.

It will be appreciated from the various embodiments described hereinabove that the configurations of devices with a geometry of polar surfaces adapted to products which are not necessarily flat, for example curved, cylindrical or corrugated, are readily derived. Furthermore, the action zones of the inductors extend over all or a part of the product.

The preceding devices were described for use with single phase current, but devices using polyphase currents are also within the scope of the invention.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Moreover, variations and changes may be made by those skilled in the art without departing from the spirit of the present invention.

What is claimed is:

1. A method for minimizing the power induced in a flat, conducting product exposed to electromagnetic forces to maintain the product in position without contact comprising subjecting certain zones of the product to two alternating, essentially equivalent, opposing magnetic fluxes acting perpendicularly to surfaces of the product on opposite sides thereof so that, in each of said zones, with the product in a position of equilibrium, the component of magnetic flux of the resultant field perpendicular to each zone is minimal and the component parallel to each zone is at a maximum, due to the mutual deflection of the two fluxes.

2. Apparatus for minimizing the power induced in a thin conducting product, exposed to electromagnetic forces to maintain it in position without contact comprising, for each zone in which electromagnetic forces are induced, at least one pair of inductors, each with several poles, the polar surfaces of which are essentially parallel to a surface of the product in each zone, the two inductors of the pair being placed in an essentially symmetrical manner with respect to a location in the zone corresponding to the desired equilibrium position of the product, with the poles facing each other in pairs on either side of the product being maintained at any instant at the same polarity and with the magnetic fluxes passing through them of essentially the same magnitude so that, with said thin product being located in said zone corresponding to said equilibrium position, said magnetic fluxes mutually deflect in said zone to minimize the power induced in said thin product.

3. Apparatus according to claim 2, wherein the magnitudes of the fluxes of each pair of inductors acting on the different zones are regulated independently whereby forces of different intensity may be obtained in each of the corresponding zones of the product.

4. Apparatus according to claim 2, for minimizing the power induced in a flat, conducting product in electromagnetic levitation including at least one pair of essentially identical horizontal inductors each having a plurality of poles and positioned on either side of the product, the successive poles of each inductor being alternatingly North and South at a given instant.

5. Apparatus according to claim 2, wherein each of the inductors has a plurality of poles of an elongated shape, whereby the apparatus is particularly but not exclusively suitable for the treatment of products in the form of a strip.

6. Apparatus according to claim 2, wherein each of the inductors comprises a plurality of poles with the principal cross-sectional dimensions being of the same order of magnitude and placed regularly in two different directions, whereby the apparatus is particularly but not exclusively suitable for the treatment of products in the form of plates.

7. Apparatus according to claim 2, wherein the geometry of the polar surfaces of the pairs of inductors is adapted to products with curved surfaces.

8. Apparatus according to claim 2, wherein the zones in which electromagnetic forces are generated constitute the entirety of the product.

9. Apparatus according to claim 3, wherein each of the inductors has a plurality of poles of an elongated shape, whereby the apparatus is particularly but not exclusively suitable for the treatment of products in the form of a strip.

10. Apparatus according to claim 4, wherein each of the inductors has a plurality of poles of an elongated shape, whereby the apparatus is particularly but not exclusively suitable for the treatment of products in the form of a strip.

11. Apparatus according to claim 3, wherein each of the inductors comprises a plurality of poles with the principal cross-sectional dimensions being of the same order of magnitude and placed regularly in two different directions, whereby the apparatus is particularly but not exclusively suitable for the treatment of products in the form of plates.

12. Apparatus according to claim 4, wherein each of the inductors comprises a plurality of poles with the principal cross-sectional dimensions being of the same order of magnitude and placed regularly in two different directions, whereby the apparatus is particularly but not exclusively suitable for the treatment of products in the form of plates.

* * * * *